(12) United States Patent
Watanabe et al.

(10) Patent No.: US 6,714,546 B1
(45) Date of Patent: Mar. 30, 2004

(54) ATM CELL MULTIPLEXER AND SCHEDULING METHOD THEREFOR

(75) Inventors: Makoto Watanabe, Nagoya (JP);
Nobuhiko Yamaguchi, Nagoya (JP);
Hiroomi Shinha, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/565,867

(22) Filed: May 5, 2000

(30) Foreign Application Priority Data

Jul. 2, 1999 (JP) .......................................... 11-189693

(51) Int. Cl.[7] .............................................. H04L 12/28
(52) U.S. Cl. .............................. 370/395.2; 370/395.31; 370/395.4
(58) Field of Search ........................... 370/395.1, 395.4, 370/395.2, 395.31, 395.21, 230

(56) References Cited

U.S. PATENT DOCUMENTS 5,771,231 A * 6/1998 Watanabe ................... 370/377
6,185,212 B1 * 2/2001 Sakamoto et al. .......... 370/395
6,226,264 B1 * 5/2001 Shibata et al. .............. 370/232
6,314,098 B1 * 11/2001 Masuda et al. ............. 370/392

FOREIGN PATENT DOCUMENTS

| JP | 5-274016 | 10/1993 |
|----|----------|---------|
| JP | 10-289129 | 10/1998 |

* cited by examiner

*Primary Examiner*—Duc Ho
(74) *Attorney, Agent, or Firm*—Katten Muchin Zavis Rosenman

(57) ABSTRACT

An ATM cell multiplexer of the present invention controls the ATM cell transmission time assigned to each cell assembler/disassembler (CLAD) based on the number of cell assembler/disassemblers (CLAD), number of connections, and connection traffic volume. Accordingly it is capable of setting in real time a main table in the ATM cell multiplexer, in which transmission authorities corresponding to a number of established connections is assigned as much as possible at equal intervals in accordance with the connections thereof.

8 Claims, 7 Drawing Sheets

FIG. 3

| ※1 | 1 | | | | 2 | | | | 3 | | | | 4 | | | |
|---|---|---|---|---|---|---|---|---|---|---|---|---|---|---|---|---|
| ※2 | 1 | 2 | 3 | 4 | 1 | 2 | 3 | 4 | 1 | 2 | 3 | 4 | 1 | 2 | 3 | 4 |
| 1 — 1 | ① | × | × | × | × | × | × | × | × | × | × | × | × | × | × | × |
| 1 — 2 | ○ | ○ | × | × | × | × | × | × | × | × | × | × | × | × | × | × |
| 1 — 3 | × | ○ | ○ | × | × | × | × | × | × | × | × | × | × | × | × | × |
| 1 — 4 | × | ○ | ○ | ○ | × | × | × | × | × | × | × | × | × | × | × | × |
| 1 — 5 | × | × | ○ | ○ | × | × | × | × | × | × | × | × | × | × | × | × |
| 1 — 6 | × | × | ○ | ○ | × | × | × | × | × | × | × | × | × | × | × | × |
| 1 — 7 | × | × | × | ○ | × | × | × | × | × | × | × | × | × | × | × | × |
| 1 — 8 | × | × | × | ○ | × | × | × | × | × | × | × | × | × | × | × | × |
| 2 — 1 | ○ | × | × | × | ② | × | × | × | × | × | × | × | × | × | × | × |
| 2 — 2 | ○ | ○ | × | × | ○ | ○ | × | × | × | × | × | × | × | × | × | × |
| 2 — 3 | × | ○ | ○ | × | × | ○ | ○ | × | × | × | × | × | × | × | × | × |
| 2 — 4 | × | ○ | ○ | ○ | × | ○ | ○ | ○ | × | × | × | × | × | × | × | × |
| 2 — 5 | × | × | ○ | ○ | × | × | ○ | ○ | × | × | × | × | × | × | × | × |
| 2 — 6 | × | × | ○ | ○ | × | × | ○ | ○ | × | × | × | × | × | × | × | × |
| 2 — 7 | × | × | × | ○ | × | × | × | ○ | × | × | × | × | × | × | × | × |
| 2 — 8 | × | × | × | ○ | × | × | × | ○ | × | × | × | × | × | × | × | × |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| 8 — 1 |  | × | × | × |  | × | × | × | × | × | × | × | ○ | × | × | × |
| 8 — 2 |  |  | × | × |  |  | × | × | × | × | × | × | ○ | ○ | × | × |
| 8 — 3 | × | × | × | × | × | × | × | × | × | × | × | × | × | ○ | ○ | × |
| 8 — 4 | × | × | × | × | × | × | × | × | × | × | × | × | × | ○ | ○ | ○ |
| 8 — 5 | × | × | × | × | × | × | × | × | × | × | × | × | × | × | ○ | ○ |
| 8 — 6 | × | × | × | × | × | × | × | × | × | × | × | × | × | × | ○ | ○ |
| 8 — 7 | × | × | × | × | × | × | × | × | × | × | × | × | × | × | × | ○ |
| 8 — 8 | × | × | × | × | × | × | × | × | × | × | × | × | × | × | × | ○ |

※1: Number of CLAD (Upper row traffic volume A, Lower row traffic volume B)

※2: Number of connection (Left side traffic volume A, Right side traffic volume B)

○ : Communication patterns that could exist

× : Communication patterns that can not exist

FIG. 4A

| CLAD 1 |
| --- |
| CLAD 2 |
| No transmission authority |
| No transmission authority |
| No transmission authority |
| No transmission authority |
| CLAD 1 |
| No transmission authority |
| No transmission authority |
| CLAD 2 |
| No transmission authority |
| No transmission authority |
| CLAD 1 |
| No transmission authority |
| No transmission authority |
| No transmission authority |
| No transmission authority |
| CLAD 2 |
| CLAD 1 |
| No transmission authority |
| . |
| . |

FIG. 4B

| CLAD 1 |
| --- |
| CLAD 2 |
| CLAD 3 |
| No transmission authority |
| No transmission authority |
| No transmission authority |
| CLAD 1 |
| CLAD 2 |
| No transmission authority |
| CLAD 3 |
| No transmission authority |
| No transmission authority |
| CLAD 1 |
| CLAD 2 |
| No transmission authority |
| No transmission authority |
| CLAD 3 |
| No transmission authority |
| CLAD 1 |
| CLAD 2 |
| No transmission authority |
| No transmission authority |
| No transmission authority |
| CLAD 3 |
| CLAD 1 |
| CLAD 2 |
| No transmission authority |
| No transmission authority |
| No transmission authority |
| No transmission authority |
| . |
| . |

FIG. 5

Unit table of each CLAD

384TS(1536TS÷4CLAD)

Scheduling order

ATM CELL MULTIPLEXER AND SCHEDULING METHOD THEREFOR

BACKGROUND OF THE INVENTION

1. Field of the Invention

The present invention relates to an ATM multiplexer equipped with a plurality of cell assembler/disassemblers, and a scheduling method therefor. Scheduling refers to controlling transmission time allocations for each cell assembler/disassembler when an ATM cell transmitted from at least 1 connection established in each cell assembler/disassembler is multiplexed and transmitted to an ATM network over one ATM line.

2. Description of the Related Art

In recent years, an ATM multiplexer has been required to interwork over an ATM network traffic that accords with a variety of communications protocols, such as voice, frame relay (FR), and HDLC (High-level Data Link Control Procedure). To realize these kinds of requirements, the ATM cell multiplexer has to implement traffic control in accordance with the service categories of each communications protocol to preserve the quality of service (QOS) thereof.

The following 2 methods exist for an ATM cell multiplexer to implement traffic control. In the first method, an ATM cell multiplexer is provided with an ATM switch, and makes use of the traffic control functions of the ATM switch. In the second method, an ATM cell multiplexer is not provided with an ATM switch, and cell streams between an ATM cell assembler/disassembler (CLAD) and ATM buses are scheduled. Because, in general, an ATM switch is costly to manufacture and requires complex control, an ATM cell multiplexer, which employs the above-mentioned second method not using an ATM switch, is generally provided for a market which requires an inexpensive, compact product.

FIG. 8 is a diagram illustrating the principle of an ATM cell multiplexer in which an ATM switch is not used. In FIG. 8, 4 CLAD 11 are connected in parallel to an ATM bus 14 and transmission authority is assigned by an ATM bus scheduler 12 allocating time slots (TS) to each CLAD in accordance with the volume of traffic of each CLAD 11 connection. An ATM cell, which is transmitted from a CLAD 11 during an allocated time slot, is sent to an ATM network by way of a line controller 13.

FIG. 9 is an example of a constitution of an ATM bus scheduler 12. In FIG. 9, the ATM bus scheduler 12 has a schedule table 201 comprising a plurality of time slots, in which the identification data of each CLAD 11 (CLAD-ID) is set. Now, when a schedule table reader 202 reads out the schedule table 201, an ATM bus controller 203 controls an ATM bus 14 such that transmission authority is assigned to a connection of a CLAD 11 of the identification data set in a time slot of this schedule table 201. That is, the identification data set in each time slot in a schedule table is data for allocating transmission time to each CLAD 11. Furthermore, a schedule management main controller 204 of CLAD 11 controls the schedule table reader 202 and ATM bus controller 203.

FIG. 10 is a diagram for illustrating a schedule table 201. In FIG. 10, a schedule table 201 is constituted from 3 tables 201a, 201b, 201c. In general, a plurality of tables is prepared in accordance with the types of service categories available. For example, when the 3 types of service categories of CBR (Constant Bit Rate), VBR (rt-VB (real time-Variable Bit Rate), nrt-VBR (non-real time-Variable Bit Rate)), and UBR (Unspecified Bit Rate) are available, in table 201a, which is prepared as the main table, there is set identification data (CLAD-ID) corresponding to a CBR connection and a VBR connection. Now, for a CBR connection, there is allocated a traffic volume time slot equivalent to the PCR (Peak Cell Rate), and for a VBR connection, there is allocated a traffic volume time slot equivalent to the SCR (Sustainable Cell Rate). Further, in table 201b, which is prepared as a sub-table of table 201a, there is set identification data (CLAD-ID) corresponding to a VBR connection. Then, a time slot corresponding to the traffic volume of the remainder of the traffic volume assigned to table 201a (that is, PCR-SCR) is allocated. Furthermore, in table 201c, which is prepared as an additional sub-table of table 201b, there is set identification data (CLAD-ID) corresponding to a UBR connection, and a time slot corresponding to the traffic volume thereof is allocated.

Now then, an ATM bus scheduler 12 assigns during 1 cycle (for example, 0.4 seconds) transmission authority to connections corresponding to identification data set in 1536TS prepared in table 201a. At this time, a time slot of a connection that is not in the process of communications, and a time slot in which a connection is not set (in the figure, "No transmission authority") are allocated to a connection having transmission authority in sub-table 201b. Furthermore, when identification data (CLAD-ID) of a connection having transmission authority is not set in sub-table 201b, a time slot is assigned to a connection having transmission authority in table 201c. By preparing a plurality of schedule tables with priorities that differ in accordance with quality of service (QOS) like this, it is possible to maintain each quality of service. That is, if a connection pertains to a service category which is required to be stricter about time delays, transmission is assigned to such connection based on a schedule table with higher priority.

In addition, to preserve the quality (QOS) of a connection of a service category that is strict about time delays (for example, either CBR or rt-VBR), the transmission authority of such a connection must be allocated at equal intervals for 1 cycle's worth of time slots (for example, 1536 slots) that are set in table 201a, the main table. For example, when the traffic volumes of a plurality of connections are the same, transmission authorities for a plurality of connections can be assigned in equal intervals by shifting by a predetermined number the time slot allocated to each connection. Conversely, when the traffic volumes of a plurality of connections differ, the intervals of time slots to which transmission authorities have been assigned will differ, respectively, even if the time slot allocated to each connection is shifted by a predetermined number, thus generating time slots with overlapping transmission authorities. In a case such as this, overlap will be avoided by shifting the transmission authority of any one of the connections to a previous or subsequent time slot. However, as explained above, for the connection of a service category that is strict about time delay, it is desirable that discrepancies in transmission authority spacing be as small and as few as possible.

Therefore, conventionally, a main table 201a, in which transmission authority intervals for a plurality of established connections are set to be as equal as possible, is prepared beforehand.

However, when a main table 201a is set beforehand as in the above-mentioned prior art, the following problem occurs when a new connection is established in accordance with installing an additional CLAD. That is, when a new connection is a connection of a service category that is strict about time delays, the transmission authority of this connection must be assigned at intervals that are as equal as possible, but, in the main table 201a, this connection has to be allocated to an empty time slot that has yet to be assigned transmission authority. An empty time slot does not always exist at equal intervals, and the larger the number of connections set in the main table 201a, the less likely it is that the time slot will be equally spaced. Therefore, there occur situations in which it is impossible to assign an equally spaced transmission authority to a newly established connection.

Conversely, suppose there is a situation, in which a main table 201a is not prepared beforehand as described above, but rather, a main table 201a is set by allocating a time slot to a connection each time in accordance with the number of connections established. In a case such as this, the following problem occurs when an attempt is made to equally allocated transmission authority to a connection to which CBR (or rt-VBR) is applied.

That is, as explained above, when traffic volume differs for each of a plurality of connections, simply assigning transmission authorities to a certain connection at equal intervals results in the occurrence of a time slot that has already been allocated. Consequently, this gives rise to the need to shift a time slot that is to be allocated. Such situations increase in accordance with the number of connections, causing allocation spacing irregularities to increase.

Now then, an increase in the allocation spacing of transmission authorities means increased cell transmission fluctuations (time delays), resulting in the inability to protect quality of service. Further, to prevent results such as this, compensation processing may be performed via software processing so as to make transmission authority allocation spacing as equal as possible. But as this compensation processing requires a certain degree of time, real-time allocation is impossible. This is inexpedient in a case in which it is necessary to establish a VC (Virtual Channel) in real time, like a SVC (Switched Virtual Channel).

SUMMARY OF THE INVENTION

Therefore, an object of the present invention is to provide an ATM cell multiplexer, which is capable of setting in real time a main table, in which transmission authorities corresponding to a number of established connections is assigned as much as possible at equal intervals in accordance with the connections thereof.

An ATM cell multiplexer of the present invention for achieving the above-mentioned object controls the ATM cell transmission time assigned to each cell assembler/disassembler (CLAD) based on the number of cell assembler/disassemblers (CLAD), number of connections, and connection traffic volume.

For example, the constitution of an ATM cell multiplexer of the present invention is characterized in that it comprises a plurality of cell assemblers/disassemblers having at least one connection; a table manager for setting a schedule table having transmission time information, which is allocated to each cell assembler/disassembler based on the number of said cell assemblers/disassemblers, the number of said connections, and the traffic volume of said connections; and a controller for controlling said transmission time in each cell assembler/disassembler according to said schedule table.

In the above-mentioned constitution, the table manager stores said schedule tables corresponding to all the communications patterns determined based on the number of cell assemblers/disassemblers, number of connections, and said traffic volume, and extracts therefrom said schedule table corresponding to a set communications pattern.

With this constitution, it is possible to set in real time the optimum schedule table relative to a communications pattern change.

Further, the table manager produces said schedule table by preparing a unit table, in which the number of time slots assigned to the schedule table is divided equally by the maximum number of cell assemblers/disassemblers that can be mounted, storing a transmission pattern table having said transmission time information corresponding to a plurality of traffic volumes, extracting a transmission pattern table corresponding to the traffic volume of the connection of each cell assembler/disassembler, and applying a transmission pattern table corresponding to each cell assembler/disassembler to a unit table corresponding to each cell assembler/disassembler.

In accordance therewith, it is possible to set in real time the optimum schedule table for a communications pattern change.

Furthermore, when a plurality of connections is established in a cell assembler/disassembler, preferably, the table manager synthesizes each transmission pattern table corresponding to the traffic volume of each connection, and applies this synthesized transmission pattern table to a unit table corresponding to a cell assembler/disassembler.

Further, a scheduling method of the present inventions is a scheduling method of an ATM cell multiplexer comprising a plurality of cell assemblers/disassemblers having at least 1 connection, and is characterized by comprising the steps of setting a schedule table having transmission time information, which is allocated to each cell assembler/disassembler based on the number of cell assemblers/disassemblers, and the number of connections, and the traffic volume of the connections; and controlling said transmission time in each cell assembler/disassembler in accordance with the schedule table.

BRIEF DESCRIPTION OF THE DRAWINGS

FIG. 3 is a diagram showing an example of a pattern index table;

FIGS. 4A and 4B are diagrams showing examples of a main table in an aspect of the embodiment of the present invention;

FIG. 5 is a diagram illustrating the principle by which the time slots of a main table are equally divided by the maximum number of onboard CLAD;

DESCRIPTION OF THE PREFERRED EMBODIMENTS

Aspects of the embodiment of the present invention will be explained hereinbelow. However, the technical scope of the present invention is not limited to the aspects of this embodiment.

Figure 1:
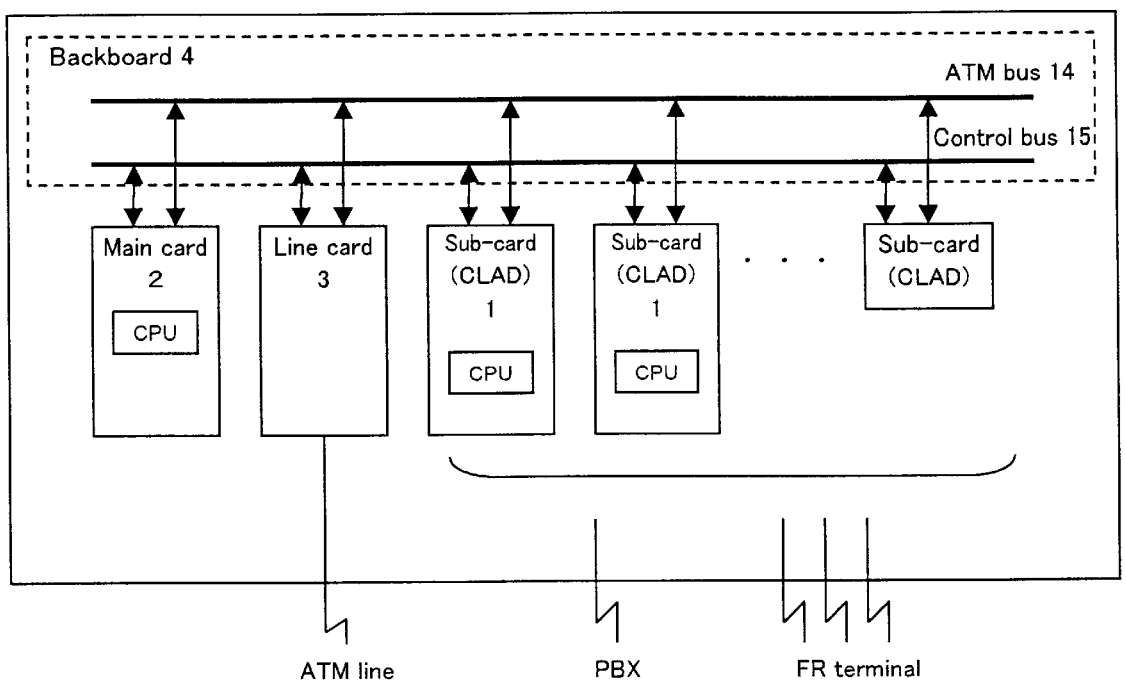
FIG. 1 is a block diagram of an ATM cell multiplexer in an aspect of the embodiment of the present invention.

FIG. 1 is a block diagram of an ATM cell multiplexer in an aspect of the embodiment of the present invention. In FIG. 1, an ATM cell multiplexer comprises a plurality of sub-cards 1 provided with CPUs that function as CLAD (cell assembler/disassemblers), a main card 2 provided with a CPU, which executes SVC/PVC control, man-machine interface control, and so forth, and also functions as an ATM bus scheduler in the present invention, a line card 3, which is connected between a ATM line and an ATM bus, and a backboard 4 having an ATM bus 14 and an inter-processor control bus 15.

Figure 2:
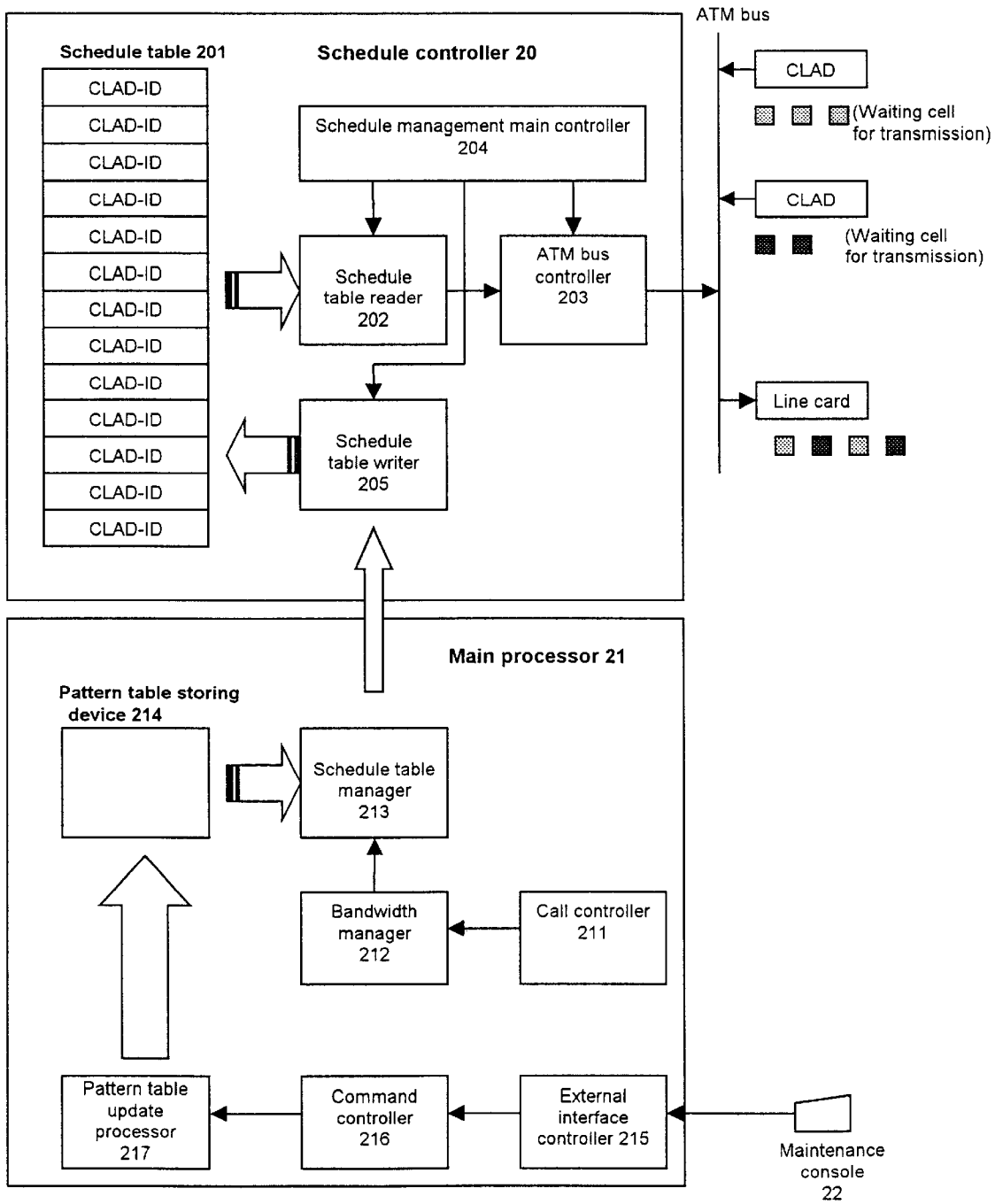
FIG. 2 is a block diagram for illustrating the principle of an ATM bus scheduler of the present invention.
Figure 10:
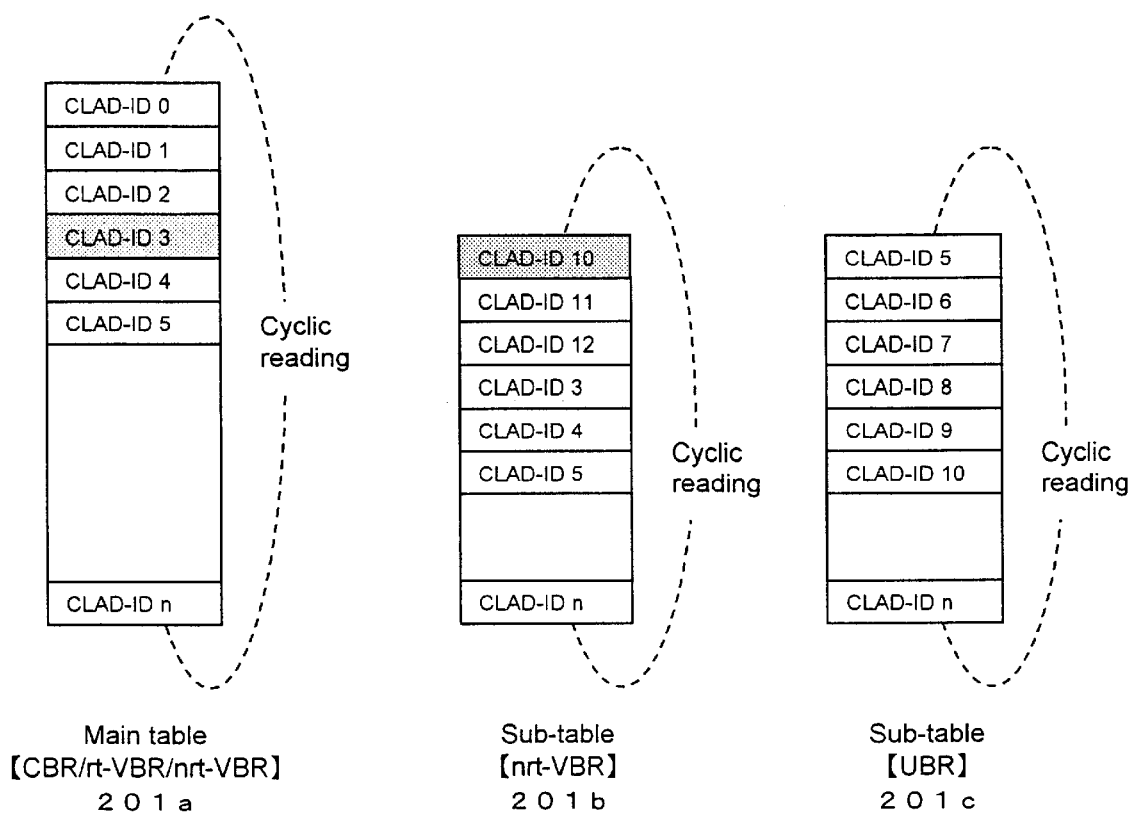
FIG. 10 is a diagram for illustrating a schedule table 201.

FIG. 2 is a block diagram for illustrating the principle of an ATM bus scheduler of the present invention. In FIG. 2, an ATM bus scheduler 12 comprises a scheduler controller 20, and a main processor 21. Now, the scheduler controller 20 has a schedule table 201 comprising the identification data of each CLAD (CLAD-ID) allocated by each time slot just as in FIG. 10. The schedule table 201, just as in FIG. 10, is constituted from a main table (corresponding to reference numeral 201a in FIG. 10), in which is defined a traffic volume corresponding to a connection of a service category, which has a high quality of service (QOS) (CBR or rt-VBR); a first sub-table (corresponding to reference numeral 201b in FIG. 10), in which is defined a traffic volume corresponding to a connection of a service category, which has a relatively high QOS (nrt-VBR); and a second sub-table (corresponding to reference numeral 201c in FIG. 10), in which is defined a traffic volume corresponding to a connection of a service category, which has a relatively low QOS (UBR).

Then, when a schedule table reader 202 reads out schedule table 201, an ATM bus controller 203 controls an ATM bus 14 so that transmission authority is allocated to each CLAD 11 connection in accordance with the time slots of this schedule table 201. Furthermore, a schedule controller 20 comprises a schedule table writer 205 for writing to a schedule table 201 a main table sent from a main processor 21 described hereinbelow. Further, a schedule management main controller 204 controls the schedule table reader 202, ATM bus controller 203, and schedule table writer 205.

The main processor 21 comprises a connection controller 211 for executing control of connection establishment/ release of each CLAD, and a bandwidth manager 212 for managing the bandwidth (traffic volume) of a ATM line of each connection based on the control of the connection controller 211. And a schedule table manager 213 generates, based on the bandwidth (traffic volume) of each connection, a main table from a variety of pattern tables having a pattern table storing device 214. Then, a main table generated by a schedule table manager 213 is sent to the schedule table writer 205 of the schedule controller 20, and the schedule table writer 205 writes same into the schedule table 201.

More specifically, as a first aspect of the embodiment of the present invention, a pattern table storing device 214 stores as a pattern table the optimum main table for all communications patterns constituted from combining beforehand the maximum number of CLAD, and the maximum number of connections, and traffic volumes capable of being accommodated in an ATM multiplexer. Then, a schedule table manager 213 extracts from the pattern table storing device 214A corresponding main table in accordance with a communications pattern change notified from a bandwidth manager 212. In accordance therewith, it is possible to change in real time a main table in accordance with a communications pattern change, such as a change in the number of connections.

Furthermore, as a second aspect of the embodiment of the present invention, a pattern table storing device 214 stores as a pattern table a plurality of unit tables set for each traffic volume for time slots that equally divide beforehand 1 cycle's worth of time slots (for example, 1536 TS) by the maximum number of CLAD that can be mounted in an ATM multiplexer. Then, a schedule table manager 213 generates a main table by combining unit tables corresponding to the traffic volume of each connection notified from a bandwidth manager 212. In accordance therewith, it is possible to change in real time a main table in accordance with a communications pattern change, such as a change in the number of connections.

Further, in FIG. 2, a pattern table contained in a pattern table storing device 214 (either a main table or a unit table) can be updated. More specifically, an update command is inputted from an external maintenance console 22 via the operation of an operator. The update command is inputted to a command controller 216 by way of an external interface controller 215. The command controller 216 controls a pattern table update processor 217 on the basis of the inputted update command. Then, the pattern table update processor 217 updates a pattern table based on the control of the command controller 216.

Next, the above-mentioned first aspect of the embodiment of the present invention will be explained in detail. FIG. 3 is a diagram showing an example of a pattern index table. A pattern index table is an index table of all communications patterns resulting from a CLAD, and the number of connections thereof, and the traffic volume thereof. FIG. 3, as an example, is a pattern index table of an ATM cell multiplexer capable of mounting 4 CLAD capable of accommodating 2 connections of traffic volume A, and 4 CLAD capable of accommodating 2 connections of traffic volume B. The upper row of the horizontal index of the figure is the number of CLAD of traffic volume A, and the lower row shows the number of CLAD of traffic volume B. Further, the left side of the vertical index of the figure is the number of connections of traffic volume A, and the right side shows the number of connections of traffic volume B. Patterns that are ○ (including ①, ②) in the figure are communications patterns that could exist, and an X is a communications patterns that cannot exist. Therefore, the pattern table storing device 214 stores a main table corresponding to the respective communications patterns corresponding to the ○ in the figure.

FIG. 4 is a diagram showing an example of a main table in an aspect of the embodiment of the present invention. FIGS. 4A, 4B, respectively, are examples of main tables corresponding to communications patterns ① and ② of FIG. 3. More specifically, for communications pattern ① of FIG. 4A, an ATM cell multiplexer is mounted with 1 CLAD each for traffic volume A and B. Then, the one CLAD has 1 connection of traffic volume A (CLAD-ID=CLAD1), and the other CLAD has 1 connection of traffic volume B (CLAD-ID=CLAD2).

As is clear from FIG. 4A and B, traffic volume A is a traffic volume for which every $5^{th}$ time slot is assigned, and traffic volume B is a traffic volume for which every $7^{th}$ time slot is assigned. Therefore, when the initial transmission authority for CLAD1 is assigned to time slot #1, transmission authorities of sequential CLAD1 from thereafter are assigned to time slots #7, #13, #19, #25, . . . in that order. Conversely, the initial transmission authority for CLAD2 is assigned to time slot #2. Then, transmission authorities of sequential CLAD2 from thereafter are assigned to time slots #10, #18, #26, . . . in that order.

For communications pattern ② of FIG. 4B, an ATM cell multiplexer is mounted with 2 traffic volume A CLAD, and 1 traffic volume B CLAD. Then, the traffic volume A CLAD have 1 connection each of traffic volume A (CLAD-ID= CLAD1, CLAD2), and the traffic volume B CLAD has 1 connection of traffic volume B (CLAD-ID=CLAD3). Similar to the explanation given above, when the initial transmission authority for CLAD1 is assigned to time slot #1, the time slots, to which transmission authorities of sequential CLAD1 are assigned from thereafter, are time slots #7, #13, #19, #25, . . . and so on. And when the initial transmission authority for CLAD2 is assigned to time slot #2, the time slots, to which transmission authorities of sequential CLAD2 are assigned from thereafter, are time slots #8, #14, #20, #26, . . . and so on.

Conversely, the initial transmission authority for CLAD3 is assigned to time slot #3. Then, the time slots, to which sequential CLAD3 are assigned from thereafter, are time slots #11, #18, #27, . . . and so on.

Furthermore, a transmission authority of CLAD3 should by rights be allocated to time slot #19 after time slot #11, but if CLAD3 transmission authority is assigned to time slot #19, the transmission authorities of CLAD1 and CLAD3 will overlap. Therefore, the transmission authority of one of these connections must be shifted to a previous or subsequent time slot so that a plurality of transmission authorities does not overlap in one time slot. In FIG. 4B, CLAD3 is shifted one [time slot] in front, but CLAD1 can also be shifted. It is also the same when CLAD2 and CLAD3 overlap.

In this manner, in the first aspect of the embodiment, an optimum main table is set beforehand for each communications pattern so that discrepancies of transmission authorities, which should be set at equal intervals, are as small and few as possible, and these main tables are stored in the pattern table storing device 214. Therefore, even when a communications pattern changes, a main table corresponding to the changed communications pattern can be selected immediately, enabling the optimum main table to be set in real time for a communications pattern change.

Next, the second aspect of the embodiment of the present invention described above will be explained in detail. FIG. 5 is a diagram illustrating the principle for dividing main table time slots by the maximum number of mountable CLAD. In this aspect of the embodiment, 1 cycle's worth of main table time slots (for example, 1536TS) are divided equally by the maximum mountable number of CLAD in an ATM cell multiplexer, and are allocated to the connections of each CLAD. For example, as shown in FIG. 5, when the maximum mountable number of CLAD in an ATM cell multiplexer is 4, for example, unit tables, which equally divide 1 cycle's worth of time slots (for example, 1536TS) by 4, the above-mentioned maximum mountable number of CLAD, are prepared in a schedule table. That is, as can be determined by the computational formula:

1536TS÷4 (CLAD)=384TS/CLAD a unit table allocated to 1 CLAD has 384TS. Now, for example, time slots #1, #5, #9, . . . are allocated for CLAD1, time slots #2, #6, #10, . . . are allocated for CLAD2, time slots #3, #7, #11, . . . are allocated for CLAD3, and time slots #4, #8, #12, . . . are allocated for CLAD4. Therefore, as in the scheduling order shown in FIG. 5, time slots are allocated in sequential order for each CLAD. That is, as for the time slots allocated for each CLAD, there are 4TS for 1 CLAD.

Figure 6A:
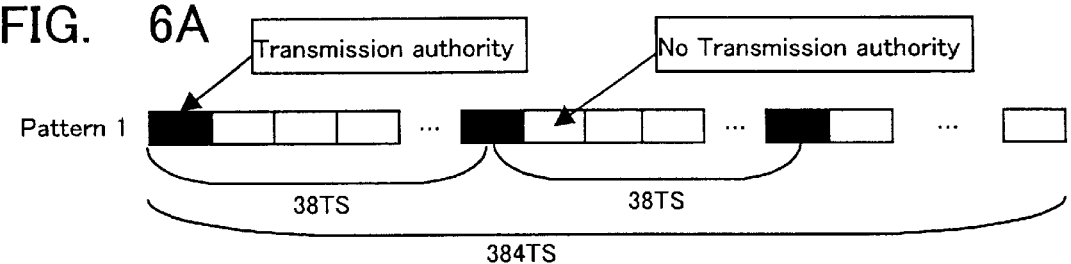
FIGS. 6A, 6B and 6C are diagrams showing examples of transmission pattern tables.
Figure 6B:
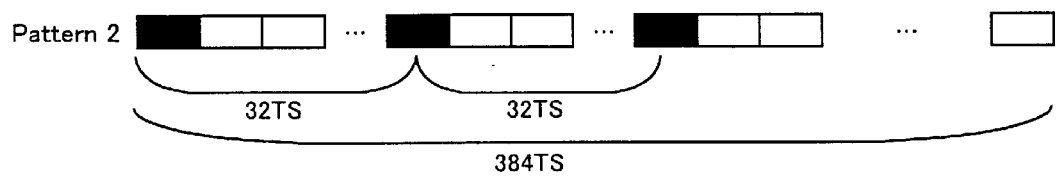
Figure 6C:
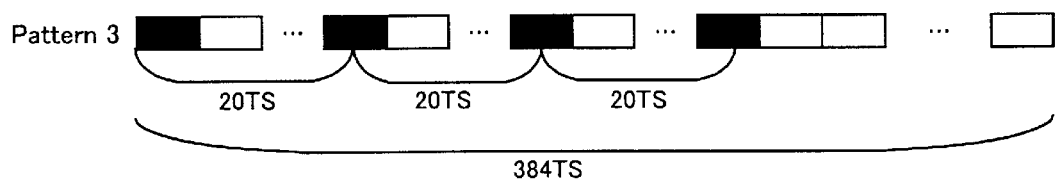

Meanwhile, in the pattern table storing device 214 of the main processor 21, there is stored a transmission pattern table that accords with each traffic volume. A transmission pattern table is set for each connection traffic volume. FIGS. 6A, 6B, and 6C are a diagram showing examples of transmission pattern tables. For example, pattern 1 of FIG. 6A is a transmission pattern table of a case in which transmission authority is assigned every 38TS. Pattern 2 of FIG. 6B is a transmission pattern table of a case in which transmission authority is assigned every 32TS, and pattern 3 of FIG. 6C is a transmission pattern table of a case in which transmission 935 authority is assigned every 20TS. Therefore, traffic volume increases in the order of FIGS. 6A, FIG. 6B, and FIG. 6C. Furthermore, in the original pattern tables thereof, settings are made in correspondence to the number of time slots (for example, 384TS) equally divided by the maximum mountable number of CLAD. Therefore, the cycle at which transmission authority is actually assigned becomes, for example,

4×38TS=152TS in the case of FIG. 6A. Similarly, it becomes 128TS in the case of FIG. 6B, and 80TS in the case of FIG. 6C. Therefore, a transmission authority cycle allocated to a transmission pattern table in correspondence to traffic volume is set at a cycle, which is a multiple of this maximum mountable number of CLAD.

Further, in FIG. 6A, for example, when transmission authority is assigned every 38TS from time slot #1 of a certain unit table, the final transmission authority in one 384TS cycle is assigned to time slot #381. By so doing, since the subsequent transmission authority returns to time slot #1, the interval therebetween (4TS) becomes largely separated from 38TS. To avoid this kind of trouble, the intervals of a number of transmission authorities are adjusted so as to become, for example, 39TS, thus enabling transmission authorities to be assigned at practically equal intervals. The same adjustments are made for the transmission pattern tables of FIG. 6B, and FIG. 6C as well, and transmission authorities are assigned at practically equal intervals.

Now then, the schedule table manager 213 of FIG. 2 extracts a corresponding transmission pattern table in accordance with the connection traffic volume of each CLAD notified from the bandwidth manager 212, and applies a transmission pattern table to the unit table allocated to each CLAD. In accordance therewith, a main table that accords with the number of CLAD, number of connections, and traffic volumes thereof can be generated automatically.

Figure 7:
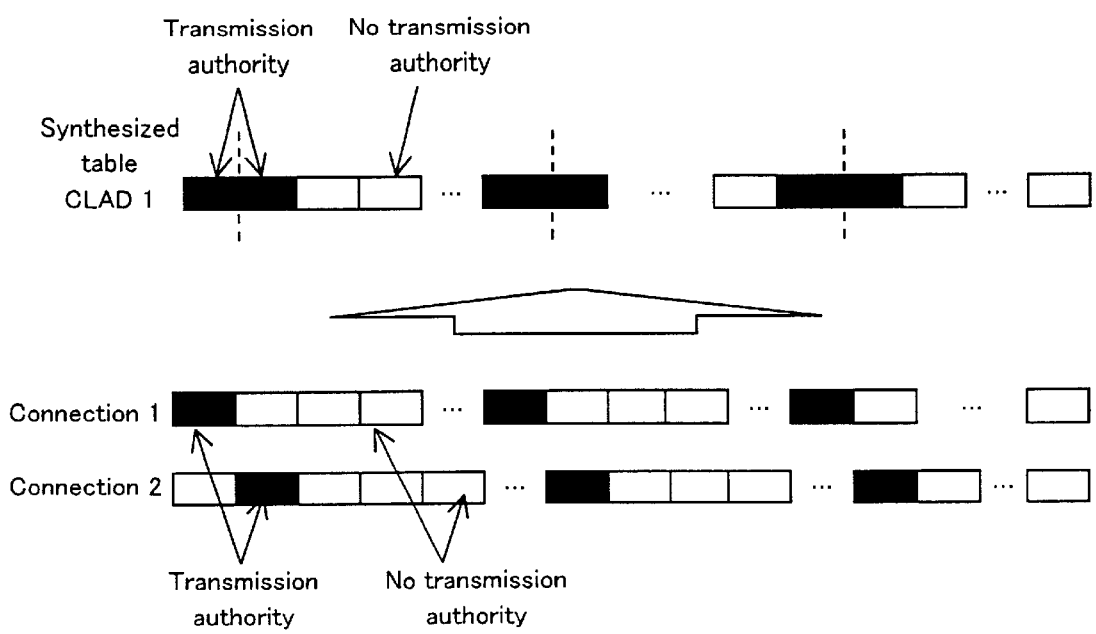
FIG. 7 is a diagram illustrating the synthesis of 2 transmission pattern tables.
Figure 8:
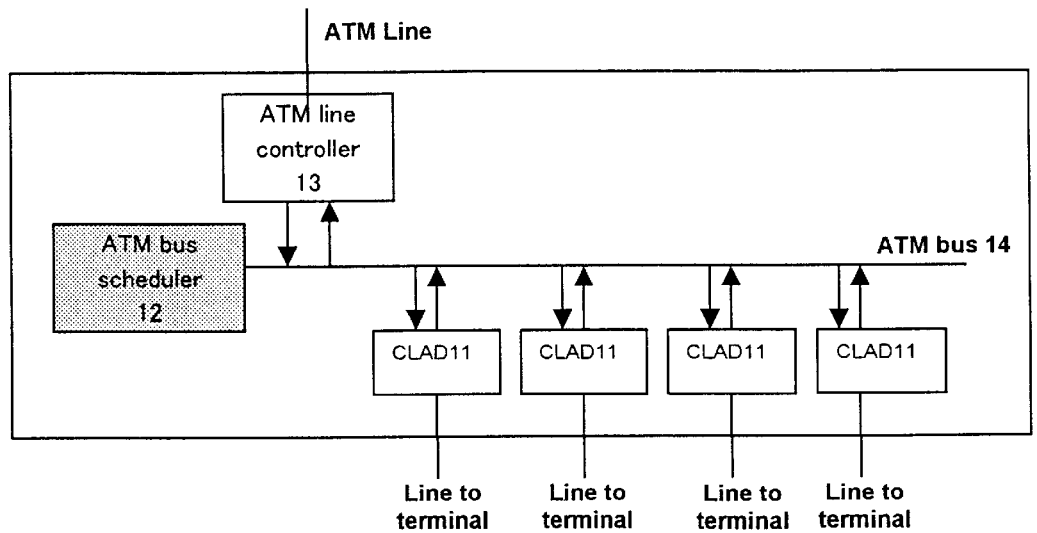
FIG. 8 is a diagram illustrating the principle of an ATM cell multiplexer of a case in which an ATM switch is not used.
Figure 9:
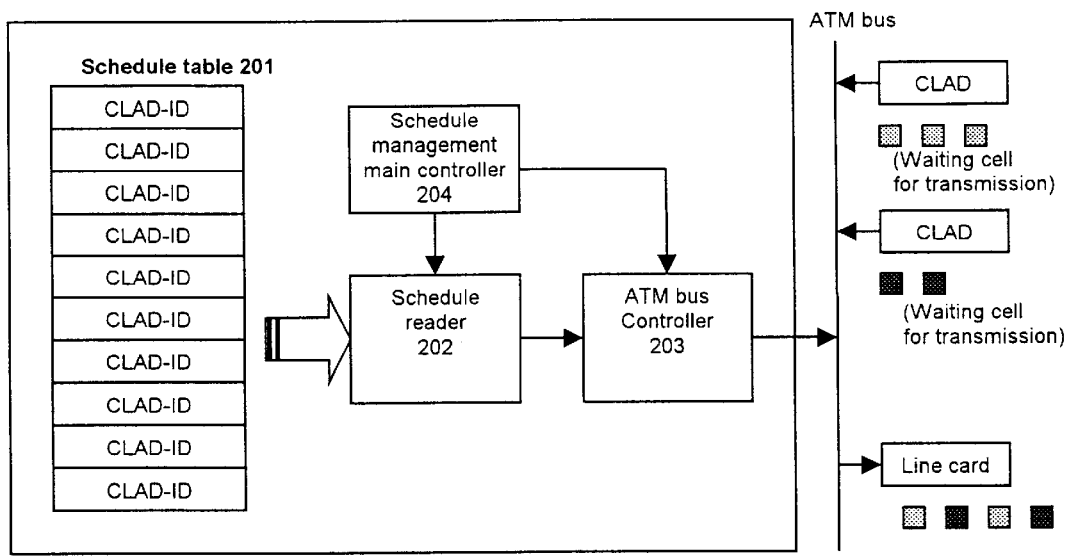
FIG. 9 is an example of a constitution of an ATM bus scheduler.

Furthermore, there are cases in which a plurality of connections is established for 1 CLAD. In such a case, after a transmission pattern table corresponding to each connection of 1 CLAD has been extracted, each transmission pattern table is generated subsequent to shifting by 1TS the time slot, to which each transmission pattern table transmission authority is assigned. FIG. 7 is a diagram illustrating the synthesis of 2 transmission pattern tables. In general, 2 connections can be established in 1 CLAD. FIG. 7 assumes a case in which the traffic volumes of 2 connections 1, 2 are the same. For example, the same transmission pattern table is extracted for each connection 1, 2. Then, the time slot, to which is assigned a transmission authority of the transmission pattern table corresponding to one of the connections (for example, connection 2), is shifted one place. Now, by synthesizing the transmission pattern table of connection 1 and the transmission pattern table of connection 2, it is possible to set a transmission pattern table corresponding to a CLAD having 2 connections 1, 2.

Furthermore, when the traffic volumes of 2 connections in 1 CLAD differ, there occur cases in which even when a time slot having the transmission authority of the one connection is shifted, this shifted time slot overlaps with the time slot having the transmission authority of the other connection. In such a case, overlap is avoided by shifting forward or backward a time slot having the transmission authority of either one of the connections.

In this manner, in the second aspect of the embodiment, there is provided a unit table, in which the time slots of a main table are equally divided beforehand by the maximum number of mountable CLAD. Meanwhile, the pattern table storing device 214 stores transmission pattern tables, in which transmission authorities are assigned at predetermined time slot intervals for each traffic volume. Then, by allocating to time slots allocated for each CLAD transmission pattern tables, which have also been set for each traffic volume, it is possible to generate for each communications pattern an optimum main table such that the discrepancies of the transmission authorities, which should be set at equal intervals, are as small and few as possible. Therefore, even in a case in which a communications pattern changes, it becomes possible to instantly generate a main table which corresponds to the changed communications pattern, enabling the optimum main table to be set in real time for a communications pattern change.

Further, the aspects of the embodiment of the present invention are not limited to the above-mentioned main table, but are also applicable to sub-tables as well.

According to the foregoing present invention, in an ATM cell multiplexer, when scheduling of a plurality of connections is performed on the basis of a schedule table, it is possible to set in practically real time on the basis of number of CLAD, number of connections, and the traffic volume thereof a schedule table in which setting changes are required in accordance with changes in the number of connections.

The scope of protection of the present invention is not limited to the above-mentioned aspects of the embodiment, but rather extends to the invention disclosed in the patent claims, and to equivalent devices.

What is claimed is:

1. An ATM cell multiplexer comprising:
   a plurality of cell assemblers/disassemblers having at least one connection;
   a table manager for setting, a schedule table having transmission time information, which is allocated to each cell assembler/disassembler based on the number of said cell assemblers/disassemblers, the number of said at least one connection, and the traffic volume of said at least one connection; and
   a controller for controlling said transmission time in each cell assembler/disassembler according to said schedule table,
   wherein said table manager stores said schedule table corresponding to all the communications patterns determined based on the number of cell assemblers/disassemblers, number of connections, and said traffic volume, and extracts therefrom said schedule table corresponding to a set communications pattern.

2. The ATM cell multiplexer according to claim 1, wherein said schedule table is changeable.

3. An ATM cell multiplexer comprising:
   a plurality of cell assemblers/disassemblers having at least one connection;
   a table manager for setting a schedule table having transmission time information, which is allocated to each cell assembler/disassembler based on the number of said cell assemblers/disassemblers, the number of said at least one connection, and the traffic volume of said at least one connection; and
   a controller for controlling said transmission time in each cell assembler/disassembler according to said schedule table,
   wherein said table manager produces said schedule table by preparing a unit table in which the number of time slots assigned to the schedule table is divided equally by the maximum number of cell assemblers/disassemblers that can be mounted, storing a transmission pattern table having said transmission time information corresponding to a plurality of traffic volumes, extracting a transmission pattern table corresponding to the traffic volume of the connection of each cell assembler/disassember, and applying a transmission pattern table corresponding to each cell assembler/disassembler to a unit table corresponding to each cell assembler/disassembler.

4. The ATM cell multiplexer according to claim 3, wherein when a plurality of connections are established in a cell assembler/disassembler, said table manager synthesizes a transmission pattern table corresponding to the traffic volume of each connection, and applies this synthesized transmission pattern table to a unit table corresponding to a cell assembler/disassembler.

5. The ATM cell multiplexer according to claim 3, wherein said transmission pattern table is changeable.

6. A scheduling method of an ATM cell multiplexer comprising a plurality of cell assemblers/disassemblers having at least one connection comprising the steps of:
   setting a schedule table having transmission time information, which is allocated to each cell assembler/disassembler based on the number of cell assemblers/disassemblers, and the number of connections, and the traffic volume of the connections; and
   controlling said transmission time in each cell assembler/disassembler in accordance with the schedule table,
   wherein schedule table corresponding to all the communications patterns determined based on the number of cell assemblers/disassemblers, number of connections, and said traffic volume are prepared, and said schedule table corresponding to a set communications pattern is extracted therefrom in said setting step.

7. A scheduling method of an ATE cell multiplexer comprising a plurality of cell assemblers/disassemblers having at least one connection comprising the steps of:
   setting a schedule table having transmission time information, which is allocated to each cell assembler/disassembler based on the number of cell assemblers/disassemblers, and the number of connections, and the traffic volume of the connections; and
   controlling said transmission time in each cell assembler/disassembler in accordance with the schedule table,
   wherein said schedule table is produced in setting step by preparing a unit table in which the number of time slots assigned to the schedule table is divided equally by the maximum number of cell assemblers/disassemblers that can be mounted, storing a transmission pattern table having said transmission time information corresponding to a plurality of traffic volumes, extracting a transmission pattern table corresponding to the traffic volume of the connection of each cell assembler/disassembler, and applying a transmission pattern table corresponding to each cell assembler/disassembler to a unit table corresponding to each cell assembler/disassembler.

8. The scheduling method according to claim 7, wherein when a plurality of connections are established in a cell assembler/disassembler, a transmission pattern table corresponding to the traffic volume of each connection is synthesized, and the synthesized transmission pattern table is applied to a unit table corresponding to a cell assembler/disassembler.

* * * * *